United States Patent
Palamone et al.

(10) Patent No.: US 6,780,363 B2
(45) Date of Patent: Aug. 24, 2004

(54) PTFE-BASED POLYMERS

(75) Inventors: Giovanna Palamone, Alessandria (IT); Valery Kapeliouchko, Alessandria (IT); Michele Laus, Alessandria (IT)

(73) Assignee: Ausimont S.p.A., Milan (IT)

(*) Notice: Subject to any disclaimer, the term of this patent is extended or adjusted under 35 U.S.C. 154(b) by 83 days.

(21) Appl. No.: 10/097,622

(22) Filed: Mar. 15, 2002

(65) Prior Publication Data

US 2002/0193495 A1 Dec. 19, 2002

(30) Foreign Application Priority Data

Mar. 20, 2001 (IT) .......................... MI01A0580

(51) Int. Cl.⁷ .......................... C08J 5/00; C08L 25/08; C08L 27/18; C08L 51/00

(52) U.S. Cl. ...................... 264/219; 106/38.2; 264/239; 525/242; 525/326.2; 525/902

(58) Field of Search .................. 106/38.3; 264/219, 264/239; 525/242, 326.2, 902

(56) References Cited

U.S. PATENT DOCUMENTS

| | | |
|---|---|---|
| 4,129,617 A | 12/1978 | Machi et al. |
| 4,334,037 A | 6/1982 | Allen .......................... 525/199 |
| 4,385,130 A | 5/1983 | Molinski et al. |
| 4,864,006 A | 9/1989 | Giannetti et al. ........... 525/199 |
| 4,990,283 A | 2/1991 | Visca et al. ................. 252/309 |
| 5,679,741 A * | 10/1997 | Breton et al. ................. 525/71 |
| 5,707,763 A * | 1/1998 | Shimizu et al. ............. 429/217 |

FOREIGN PATENT DOCUMENTS

| | | |
|---|---|---|
| EP | 0 735 093 A1 | 10/1996 |
| GB | 952452 | 3/1964 |
| GB | 1 548 990 | 7/1979 |

* cited by examiner

Primary Examiner—Kelechi C. Egwim
(74) Attorney, Agent, or Firm—Arent Fox PLLC

(57) ABSTRACT

Compositions containing core-shell particles having a core polytetrafluoroethylene-based polymers (PTFE) and shell styrene-based polymers (PS), wherein the particles contain an amount by weight of PTFE from 3 to 50%, preferably from 5 to 30% by weight, wherein the core PTFE particles have an average diameter from 5 to 100 nm, preferably from 10 to 70 nm, the core-shell particles having an average diameter from 10 to 170 nm, preferably from 20 to 100 nm.

8 Claims, No Drawings

PTFE-BASED POLYMERS

The present invention relates to a process for preparing core-shell aqueous dispersions having the core based on PTFE and shell on polystyrene (PS), wherein the particles contain an amount by weight of PTFE from 3 to 50%, preferably from 5 to 30%, and to the core-shell product as above defined.

In particular the invention relates to a process wherein, starting from PTFE latexes containing particles having a diameter from 5 to 100 nm, preferably from 10 to 70 nm, on which styrene is polymerized, with formation of a PS shell, a latex containing particles formed by a PTFE core and by a polystyrene shell is obtained.

The so obtained nanocomposite can be used as such to obtain manufactured articles or coatings having improved mechanical properties, resistance to wear. The nanocomposites of the invention can also be used as additives for polymers styrene-based, due to their very good compatibility with said polymers.

In U.S. Pat. No. 4,334,037 it is known to obtain manufactured articles by moulding of compositions obtained by mixing PS granules with at least 5% by weight of PTFE granules having an average particle diameter lower than 50 $\mu$m, preferably having a diameter from 5,000 to 7,000 nm. The PTFE granules were uniformly dispersed in the polystyrene granules, the mixture heated to form a homogeneous plasticized mass, that was afterwards extruded. The manufactured articles obtained by moulding the extruded material show good resistance to wear and to friction. Said manufactured articles are particulary suitable to be used in aqueous medium. The drawback of said manufactured articles is that they do not show homogeneous properties when said articles are obtained by direct moulding the mixture of granules of PTFE with polystyrene. Tests carried out by the Applicant have shown that the two polymers are poorly compatible and manufactured articles having poor mechanical properties, such as for example the impact-resistance, are obtained.

Besides tests carried out by the Applicant to try to increase the compatibility between PTFE and PS starting from their polymer latexes, have not lead to a meaningful improvement with respect to the powder mixing. Also in this case segregation phenomena take place of the two polymers into separated phases, during the coagulation. This last step is essential to obtain the material which is then subjected to moulding or to extrusion to obtain the final manufactured article. Greater segregation is obtained and therefore lower mechanical properties, starting from PTFE latexes wherein the particles have a diameter lower than 100 nm.

The need was felt to have available compositions styrene-based polymers containing PTFE having improved mechanical properties, improved wear resistance without showing the drawbacks of the compositions of the prior art.

An object of the present invention are compositions containing core-shell particles having a core polytetrafluoroethylene-based polymers (PTFE) and shell styrene-based polymers (PS), wherein the particles contain an amount by weight of PTFE from 3 to 50%, preferably from 5 to 30% by weight, wherein the PTFE core particles have an average diameter from 5 to 100 nm, preferably from 10 to 70 nm, the core-shell particles having an average diameter from 10 to 170 nm, preferably from 20 to 100 nm.

For polytetrafluoroethylene-based polymers (PTFE), homopolymers of tetrafluoroethylene or copolymers of TFE with one or more monomers containing at least one ethylene type unsaturation are meant, said comonomers in amounts from 0 up to 3% by moles, preferably from 0.01 to 1% by moles with respect to the total moles of the monomers.

The comonomers having ethylene unsaturation which can be used are both of hydrogenated and fluorinated type; among the hydrogenated ones we can mention ethylene, propylene, acrylic monomers, for example methylmethacrylate, (meth)acrylic acid, butylacrylate, hydroxyethylhexylacrylate, styrene monomers, such as for example styrene. Among the fluorinated comonomers it can be mentioned:

$C_3$–$C_8$ perfluoroolefins, such as hexafluoropropene (HFP);

$C_2$–$C_8$ hydrogenated fluoroolefins, such as vinyl fluoride (VF), vinylidene fluoride (VDF), trifluoroethylene, hexafluoroisobutene, perfluoroalkylethylene $CH_2$=CH—$R_f$, wherein $R_f$ is a $C_1$–$C_6$ perfluoroalkyl;

$C_2$–$C_8$ chloro- and/or bromo- and/or iodo-fluoroolefins, such as chlorotrifluoroethylene (CTFE);

$CF_2$=$CFOR_f$ (per)fluoroalkylvinylethers (PAVE), wherein $R_f$ is a $C_1$–$C_6$ (per)fluoroalkyl, for example $CF_3$, $C_2F_5$, $C_3F_7$;

$CF_2$=CFOX (per)fluoro-oxyalkylvinylethers, wherein X is:

a $C_1$–$Cl_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl; fluorodioxoles, preferably perfluorodioxoles.

Fluorinated comonomers are preferred.

For styrene-based polymers (PS), styrene homopolymers or styrene/acrylonitrile (SAN) polymers, styrene elastomers (SBR), acrylo/butadiene/styrene (ABS) polymers, methacryl/butadiene/styrene (MBS) polymers, etc., are meant. These products are well known in the prior art.

The compositions (nanocomposites) of the invention can be used as such to obtain manufactured articles or coatings having improved mechanical properties, wear resistance.

The nanocomposites of the invention can also be used as additives for styrene-based polymers, due to their compatibility with said polymers. As additives they are used in an amount so that in the final composition there is an amount of PTFE from 0.1% to 10% by weight. When used as additives, the nanocomposites of the invention give an improved processability, for example they allow to operate with a higher extrusion speed, and give an extruded product having improved surface properties (lower roughness).

The core-shell products of the invention allow to obtain manufactured articles with homogeneous properties, both when used alone and as additives. It has been found that there are no segregation phenomena.

The invention compositions are obtainable by a process comprising the preparation of a nanoemulsion containing particles formed by polytetrafluoroethylene polymers having an average diameter from 5 to 100 nm, preferably from 10 to 70 nm, on which a styrene-based polymer is polymerized, the amount of surfactant present in the nanoemulsion before the polymerization of the styrene-based polymer must be such that the surfactant covers the particle surface formed by polytetrafluoroethylene polymers for a percentage from 2 to 100%.

It has been found by the Applicant that if the PTFE nanoemulsion latex is used which comprises all the surfactant necessary for the PTFE polymerization to avoid the PTFE latex coagulation, homogeneous core-shell dispersions are not obtained, since there are also segregated particles formed by styrene-based polymers. This is particularly critical when manufactured articles based on the core-shell nanocomposites of the invention have to be prepared. In this case segregation phenomena would arise which would lead to a final manufactured article having worsened mechanical properties.

More specifically the process for the preparation of the core shell polymer with PTFE-based core and PS-based shell comprises the following steps:

preparation of the PTFE nanoemulsion with particles having the above sizes, removal of the nanoemulsion surfactant amount until obtaining such an amount as to cover the surface of the PTFE particles for a surface fraction comprised between 2 and 100%, feeding the so obtained nanoemulsion in a polymerization reactor, maintained under nitrogen flow and under stirring, and addeding:

an amount of water to have a PTFE concentration in the range 5–150 g/l, styrene, and optionally other comonomers to obtain the mentioned styrene-based polymers, the polymerization initiator, then polymerization takes place until obtaining core-shell particles wherein the particle and shell sizes are those above mentioned, polymer discharge from the reactor.

The polymerization phase of the styrene monomers is carried out according to known methods of the prior art, for example by any temperatures in the range 60° C.–80° C., initiators which produce radicals at said temperatures, for example alkaline metal or ammonium persulphates.

The preparation of the PTFE nanoemulsion is carried out for example according to the following process:

a) preparation of an aqueous microemulsion of perfluoropolyethers (PFPE) having non reactive end groups or end groups optionally containing 1 or more atoms of H, Cl instead of fluorine;

b) feeding of the microemulsion into the polymerization reactor, in such amount whereby the oil perfluoropolyether phase of the microemulsion is present in a concentration higher than 2 ml per litre of reaction medium, preferably from 2.2 ml up to 50 ml per litre, still more preferably between 3 and 30 ml per litre of reaction medium;

c) feeding of the reaction medium into the polymerization reactor, reactor purge, reactor pressurization with gaseous TFE, optional addition of surfactants, stabilizers, comonomers, transfer agents;

d) addition of the initiator, and optionally during the polymerization of further amounts of surfactants, stabilizers, comonomers, transfer agents;

e) discharge from the reactor of the polymer latex.

The microemulsions used in the process of the present invention are described in U.S. Pat. Nos. 4,864,006 and 4,990,283, herein incorporated by reference, wherein instead of perfluoropolyethers having the mentioned non reactive end groups, also hydrofluoropolyethers having one or both the end groups containing one H atom, or having one or more chlorine atoms at the place of fluorine in the chain end groups, can be used. The molecular weight of perfluoropolyethers (PFPE) which can be used can also be lower than 500, for example 300 as number average molecular weight. The nanoemulsions obtained with the use of PFPE having a low molecular weight, of the order of 350–600, preferably 350–500, can be used advantageously in the applications wherein their quantitative removal is required.

The surfactants which can be used both for preparing the microemulsion and during the polymerization, are (per) fluorinated surfactants known in the prior art and in particular are those described in the cited patents or those having one end group wherein one or more fluorine atoms are substituted by chlorine and/or hydrogen. Among (per) fluorinated surfactants, anionic (per) fluorinated surfactants, having a (per) fuoropolyether or (per) fluorocarbon structure, having for example carboxylic or sulphonic end groups salified with alkaline or alkaline-earth metals, cationic (per) fluorinated surfactants, for example quaternary ammonium salt, and non ionic (per) fluorinated surfactants, can be mentioned. These surfactants can also be used in admixture.

Anionic (per)fluorinated surfactants are preferred and those having salified carboxylic end groups are more preferred.

The molecular weight of the (per)fluorinated chain is in the range 350–1,000, preferably 400–700.

Optionally in the preparation of the PTFE nanoemulsion, iodinated and brominated chain transfer agents can be used. $R_fI_2$ can for example be mentioned, wherein $R_f$ is a perfluorocarbon from 4 to 8 carbon atoms.

To obtain the manufactured articles of the invention composition one can add additives commonly used for the styrene-based resins. Fillers, antistatics, antioxidants, plasticizers, impact modifiers, stabilizers, dyes can be mentioned.

The manufactured articles can be also obtained by direct moulding or extrusion starting from the granules obtained by coagulation of the latex. Said articles show high homogeneity and are crack and surface defect free.

The coatings are obtainable by applying on the substrata the compositions of the invention, optionally added with the known additives of the prior art, by spray method or by dipping.

The following Examples illustrate the invention without limiting the scope thereof.

EXAMPLES

Calculation of the Surfactant Amount In the Latex

The surfactant amount in the latex has been determined by gas-chromatographic analysis of the corresponding methyl ester, according to the following process:

2 ml of latex have been taken and treated with 2 ml of acid methanol. Esterification is allowed to take place at 70° C. for 16 h in a hermetically sealed test tube. At this point to the mixture 1 ml of Delifrene A113 is added. Two phases separate and 2 ml of the lower phase are taken, and 4 ml of water are added.

It is stirred and by letting stay, 2 phases are unmixed, the lower fluorinated phase which contains the surfactant ester is taken. The solution is injected into a gas-chromatograph with capillary column (capillary gaschromatographic system equipped with introduction split/splitless set 200° Capillary column type CP-SIL 8CB 25 cm×0.32 mm×1.3 μm-Helium carrier=50 KPa splitting flow 26 ml/min-Make-up carrier: nitrogen 40 KPa.-Volume introduced 1 μl -Temperature profile 40° C.×4', 40°/' up to 60°, 8°/' up to 84°, 40°/' up to 220°×10'.-Detector FID set at 250° C. (ratio air/hydrogen= 100/90 KPa)-Electrometer: Range 0, AT 0).

Determination of the Percentages by Weight of PTFE and PS in the Nanocomposite

The percentages by weight of PTFE and PS in the nanocomposite have been obtained by subjecting the polymers to TGA analysis using a Perkin Elmer 7 instrument. About 10 mg of dried polymer have been subjected to heating from room temperature up to 700° C. with gradient of 10° C./min. The % losses obtained between 375° C. and 450° C. are to be referred to PS, those between 450° C. and 600° C. to PTFE.

Calculation of the Average Particle Diameter

The average particle diameter has been calculated by means of an instrument based on the Laser light scattering, in particular on Photon Correlation Spectroscopy, equipped with Brookhaven 2030 AT model correlator and Argon Laser light source having a wave length of 514.5 nm by Spectra-Phisics. The latex samples to be measured are suitably diluted with bidistilled water and filtered by Millipore filter 0.2 $\mu$m. The scattering measurement is carried out at room temperature and at a 90° angle. The latex particle diameter is obtained by the cumulant method.

Calculation of the Polymer Content in the Latex as q/l $H_2O$

The content in dry polymer of the latex discharged from the reactor is determined by weight loss at 150° C. for 1 hour. About 20 grams of latex are weighed in a glass beaker and put in a stove to dry for 1 hour at 150° C. The dry latex content, expressed as g solid/l of water is obtained from the formula:

$$\text{Dry product} = \frac{\text{weight after drying}}{\text{initial latex weight} - \text{weight after drying}} \times 1000$$

Calculation of the Total Surface of the PTFE Particles in the Nanoemulsion Referred to 1 Litre of Water For the calculation of the total surface of the PTFE particles in the nanoemulsion one determines the particle number contained in 1 litre of polymerization water calculated by means of the following formula:

$$\frac{\text{Dry product (g/litre)}}{(\text{volume}_{part.}) \times \text{density}_{polymer}}$$

wherein the polymer density is that of PTFE.

To calculate the total surface of the polymer particles, referred to 1 litre of water, the number of particles is multiplied by the mean surface of one particle.

Calculation of the Surface/l $H_2O$ which the Used Surfactant Amount Can Theoretically Cover For the calculation of the surface which can theoretically be covered by the surfactant, one determines the surface covered by one surfactant molecule and the molar concentrtion (M) of the same in the nanoemulsion.

The surface covered by surfactant is calculated by the following formula:

$$\text{surfactant molecule surface} \times M \times N_A$$

wherein M is as above defined and $N_A$ is the Avogadro number. The surface covered by a surfactant molecule is 40 $Å^2$ and has been determined by the surfactant adsorption isotherms in microemulsion on PTFE, according to the following method.

A PTFE latex is treated by passage on resin till a conductivity lower than 20 $\mu$S/cm. The residual surfactant in the latex is analyzed, which must not be higher than 100 ppm and the solid content in the latex is determined. The latex is diluted. Various samples are prepared, obtained by mixing each time one part of latex with 2 parts of a surfactant solution having a growing concentration and adding water.

The samples are homogeneized and are then let stay for 24 hours so as to reach the sharing out balance for the surfactant.

Lastly the samples are centrifuged and the amount of surfactant present in the supernatant layer is determined. By difference with respect to the initial amount, the surfactant amount adsorbed at the surface of each sample is determined. The data related to the adsorbed surfactant amount (moles/$m^2$) are reported in a graph in function of the surfactant concentration in the supernatant layer at the balance.

From the plateau value the surface occupied by a surfactant molecule (cross sectional area) on the polymer surface is calculated.

Determination of the Particle Shape and Structure and of the Particle Distribution in the Film The particle shape and the core-shell structure have been pointed out by TEM Microscopy (Transmission electron microscopy).

Moulding and Determination on the Moulded Samples of the Glass Transition Temperature The sample has been prepared by pressing the granules at room temperature under a pressure of 490 MPa (5 ton/$cm^2$) for 5 minutes and then the pressure is set at a value of 49 MPa (500 Kg/$cm^2$) and the sample was heated under a fixed temperature gradient to 150° C. After reaching said temperature pressure was removed and the specimen cooled at room temperature. The obtained specimen had a thickness of 2 mm, a width of 5 mm and a length of 20 mm.

The Tg was determined with a Rheometric Scientific Dynamic Mechanical Thermal Analyzer DMTA V. The measurement has been done through a dynamic temperature ramp test from 40° C. to 260° C. following a heating ramp of 4° C./min.

Example 1A

Preparation of a PTFE nanoemulsion modified with perfluorodioxole

In a glass vessel:

5 parts of an ammonium salt of an acid having the following structure (I):

$$ClC_3F_6O(C_3F_6O)_nCF_2COOH \qquad (I)$$

wherein n is such to give an acidimetric molecular weight equal to 530, 3 parts of a perfluoropolyether having a structure of the type (II)

$$R_fO(C_3F_6O)_{n'}(CF_2O)_{m'}R'_f \qquad (II)$$

wherein n', m' are integers such to give a number average molecular weight of about 700, $R_f$, $R'_f$ equal to or different from each other are perfluoroalkyls from 1 to 3 carbon atoms, such that the molecular weight is that indicated, 8 parts of water, are introduced.

A perfectly limpid microemulsion is obtained in a temperature range between 2° C. and 46° C.

An amount equal to 14,250 grams of the previous microemulsion, equal to 4,050 g of surfactant, and 2 Kg of paraffin with softening point of 52° -54° C., are compounded with 270 litres of degassed water in a 400 litre autoclave mechanical stirrer and previously put under vacuum (-660 mm Hg). The autoclave is maintained under mechanical stirring. 1,200 g of perfluorodioxole are fed into the reactor. The reactor is pressurized at 20 bar (2 MPa) with $C_2F_4$ and the medium temperature brought to 90° C. At this point into the reactor 700 cc of ammonium persulphate initiator solution containing 14 g of the compound are fed.

When the pressure decreases of 0.5 bar the reactor pressure is restored and maintained at 20 bar by feeding $C_2F_4$.

After 30 minutes from the start the TFE feeding is stopped.

The properties of the obtained aqueous dispersion are reported in Table 1.

Example 1B
Preparation of a PTFE Nanoemulsion in the Presence of an Iodinated Chain Transfer Agent 30 l of degassed water and 2,500 g of the microemulsion prepared in Example 1A, equal to 710 g of surfactant, are fed into a 50 litre reactor, maintained under stirring, wherein the vacuum is made (−660 mm Hg). The reactor is pressurized at 20 bar with $C_2F_4$ and the medium temperature brought to 90° C.

At this point 100 cc of ammonium persulphate initiator solution containing 2 g of initiator are fed.

When the pressure decreases of 0.5 bar the reactor pressure is restored and maintained at 20 bar by feeding $C_2F_4$.

After 10 minutes 250 g of transfer agent $C_4F_8I_2$ are fed into the reactor. After 19 minutes from the start the TFE feeding is stopped.

The properties of the obtained aqueous dispersion are reported in Table 1.

The analysis of the iodine amount in the polymer, carried out by fluorescence by the equipment ASOMA® Instruments, mod. 200 series 4585, has indicated that the transfer agent has been quantitatively incorporated in the polymer.

Example 2
Obtainment of a Dispersion Containing Core-Shell Particles by Using the Nanoemulsion Obtained in Example 1A The latex obtained in Example 1A has been dialyzed by using membranes having pores of 25 Å diameter, which allow the passage of the surfactant but not of the polymer particles. The dialysis has been continued until having a surfactant content in the nanoemulsion equal to the amount required to cover the 74% of the total surface of the PTFE particles contained in 1 l of $H_2O$.

The values of surface/l $H_2O$ theoretically covered by the surfactant before and after the dialysis of the nanoemulsion of Example 1A are reported in Table 2.

In a 1 litre reactor, maintained under stirring and under nitrogen atmosphere, an aliquot equal to 10 cc of the dialyzed latex is transferred, which is compounded with 500 cc of degassed water.

The mixture temperature is brought to 75° C. When the system is stabilized at this temperature, 70 cc of styrene are dropped in 30 min. Subsequently 15 cc of a solution containing 160 mg of ammonium persulphate initiator are fed into the reactor.

After 23 h the reaction is stopped, obtaining a lactescent aqueous dispersion.

The TEM micrography of the dispersion shows spheroidal particles containing a clear zone, corresponding to the PTFE core, which is surrounded by, or englobed in, a darker zone which constitutes the PS shell.

The TEM micrography of the film made from the obtained latex shows an homogeneous structure of arranged, uniformly distributed core-shell particles.

The film was prepared by evaporating an aliquot of the latex placed on a metallic support.

The properties of the obtained aqueous dispersion are reported in Table 3.

Example 3
Obtainment of a Dispersion Containing Core-Shell Particles by Using the Nanoemulsion Obtained in Example 1A, Increasing the Ratio by Weight PTFE/PS with Respect to Example 2

The dialyzed latex obtained in Example 2 has been used.

20 cc of the dialyzed latex are transferred into a 1 litre reactor, maintained under stirring and under nitrogen atmosphere, and compounded with 500 cc of degassed water.

The mixture temperature is brought to 75° C. When the system is stabilized at this temperture, 35 cc of styrene are dropped in 15 min. Subsequently 15 cc of a solution containing 80 mg of ammonium persulphate initiator are fed into the reactor.

After 23 h the reaction is stopped, obtaining a lactescent aqueous dispersion.

The TEM micrography of the dispersion shows spheroidal particles containing a clear zone, corresponding to the PTFE core, which is surrounded by, or englobed in, a darker zone which constitutes the PS shell.

The properties of the obtained aqueous dispersion are reported in Table 3.

Example 4
Obtainment of a Dispersion Containing Core-Shell Particles by Using the Nanoemulsion Obtained in Example 1B The latex obtained in Example 1B has been dialyzed as described in Example 2. The dialysis has been continued until having a surfactant content in the nanoemulsion equal to the amount required to cover the 34% of the total surface of the PTFE particles contained in 1 l of $H_2O$.

The values of surface/l $H_2O$ theoretically covered by the surfactant before and after the dialysis of the nanoemulsion of Example 1B are reported in Table 2.

In a 1 litre reactor, maintained under stirring and under nitrogen atmosphere, an aliquot equal to 12 cc of the dialyzed latex is transferred, which is compounded with 500 cc of degassed water.

The mixture temperature is brought to 75° C. When the system is stabilized at this temperature, 70 cc of styrene are dropped in 30 min. Subsequently 15 cc of a solution containing 160 mg of ammonium persulphate initiator are fed into the reactor.

After 23 h the reaction is stopped, obtaining a lactescent aqueous dispersion.

The TEM micrography of the dispersion shows spheroidal particles containing a clear zone, corresponding to the PTFE core, which is surrounded by, or englobed in, a darker zone which constitutes the PS shell.

The properties of the obtained aqueous dispersion are reported in Table 3.

Example 5
Obtainment of a Dispersion Containing Core-Shell Particles by Using the Nanoemulsion Obtained in Example 1B, Increasing the Ratio by Weight PTFE/PS with Respect to Example 4

An aliquot of the dialyzed latex obtained in Example 4 is used.

24 cc of the dialyzed latex are transferred into a 1 litre reactor, maintained under stirring and under nitrogen atmosphere, and compounded with 500 cc of degassed water.

The mixture temperature is brought to 75° C. When the system is stabilized at this temperature, 35 cc of styrene are dropped in 15 min. Subsequently 15 cc of a solution containing 80 mg of ammonium persulphate initiator are fed into the reactor.

After 23 h the reaction is stopped, obtaining a lactescent aqueous dispersion.

The TEM micrography of the dispersion shows spheroidal particles containing a clear zone, corresponding to the PTFE core, which is surrounded by, or englobed in, a darker zone which constitutes the PS shell.

The properties of the obtained aqueous dispersion are reported in Table 3.

Example 6 (Comparative)
Obtainment of a Dispersion Containing Core-Shell Particles by Using the Nanoemulsion Obtained in Example 1B without Carrying Out the Latex Dialysis.

Example 5 is repeated by using the same amount of the various reactants but using the non dialyzed latex of Example 1B.

After 23 h the reaction is stopped, obtaining a lactescent aqueous dispersion.

The TEM micrography of the dispersion shows the presence of two classes of particles, as defined hereinafter:
- a class formed by composite spheroidal particles, containing a clear zone, corresponding to the PTFE core, which is sourrounded by, or englobed in, a darker zone which constitutes the PS shell;
- a class formed by homogeneous spheroidal particles, with an uniformly dark colour, having a larger diameter with respect to the particles of the previous class. These homogeneous spheroidal particles are formed only by PS.

The average particle diameter results of 49.8 nm and it is larger than the average diameter of the particles obtained in Example 5 (Table 3).

Example 7
Moulding of the Coagulated and Dried Polymer from the Latex Obtained in Example 2 and Tg Determination on the Obtained Specymen The latex obtained in Example 2, having an average particle size of 97.6 nm, containing core-shell particles according to the invention, has been coagulated by adding $HNO_3$. The ratio core fluorinated/shell polystyrene is found to be 5.2/94.8 by weight (see Table 3). The granulated product was separated from the mother liquor and dried. The obtained powder has been molded to obtain a specimen. The molding conditions have been set forth above.

The obtained specimen (thickness 2 mm) at a visual inspection is uniformly opaque: this means that it is homogeneous.

The glass transition temperature was 123° C.

Example 8A
Preparation of a Polystyrene Latex

In a 10 litre reactor, under stirring and under a nitrogen atmosphere are loaded 8 litres of degassed water and 130 g of sodium dodecyl sulphate. The temperature of the aqueous solution is brought to 75° C. When the system is stabilized at said temperature, 1300 ml of styrene are dropwise added. In the reactor was then loaded 100 ml of an aqueous solution containing 2.1 g of ammonium persulphate. After 24 hours at 75° C. the reaction was stopped. The obtained latex had a solid content of 12% by weight. The average particle diameter was of 120 nm.

Example 8
Moulding of a Granule Blend Obtained through Co-Coagulation of the Latex Obtained in Example 3 with the Polystyrene Latex The latex obtained in Example 3, having average particle size of 61 nm, containing core-shell particles according to the invention, has been co-coagulated with an aliquot of the polystyrene latex of Example 8A so to have a ratio fluorinated polymer/hydrogenated polymer 5.2/94.8 by weight. The granulated product has been separated from the mother liquor and dried. The obtained powder has been molded and, as in Example 7, it was obtained a uniformly opaque, homogeneous specimen.

The glass transition temperature was 121° C.

Example 9 (Comparative)
Moulding of a Granule Blend Obtained Through the Co-Coagulation of the Latex Obtained in Example 1A with the Polystyrene Latex The latex obtained in Example 1A, containing particles of modified PTFE, having average particle size of 50 nm (see Table 1), has been co-coagulated with an aliquot of the polystyrene latex of Example 8A, so to have a ratio fluorinated polymer/hydrogenated polymer 5.2/94.8 by weight. The granulated product has been separated from the mother liquor and dried. The powder was very difficult to mold and the obtained specimen was non-homogeneous: it has a structure formed by sections showing different opaqueness: some points of the specimen are almost transparent.

The glass transition temperature was 104° C., that is significantly lower with respect to those given by the specimens of both Examples 7 and 8. In this case the Tg value is very near that of polystyrene (100° C.).

Example 10 (Comparative)
Moulding of a Granule Blend Obtained by Mixing the Coagulated and Dried Polymer Obtained in Example 1A with the Coagulated and Dried Polymer Obtained from the Polystyrene Latex The latex obtained in Example 1A has been coagulated by addition of nitric acid and the solid separated from the mother liquors and dried. The powder, having an average particle size comprised between 5 and 7 micron, was mixed with a polystyrene powder obtained by coagulating the polystyrene latex in the same way as the latex of Example 1A. The ratio fluorinated polymer/hydrogenated polymer was 5.2/94.8 by weight. The powder was very difficult to mold. The obtained specimen was found to be non-homogeneous and it has the same features described for the specimen of Example 9 comparative.

This example confirms the results obtained in example 9 comparative. In fact even starting from a mixture formed of coagulated powders from a PTFE latex and a polystyrene latex, instead of a powder obtained by coagulating an aqueous mixture of the corresponding latexes, it is not possible to obtain an homogeneous manufactured article by direct moulding.

TABLE 1

Obtainment of the nanoemulsions according to Examples 1A and 1B. Type of modifier and used amounts of initiator and surfactant and properties of the obtained nanoemulsion.

| Ex. | Modifying monomer | Initiator conc. $M \times 10^{-4}$ | Surfactant conc. M | Particle diameter nm | Dry product $g/l\ H_2O$ | Particle number/ $1\ H_2O \times 10^{18}$ |
|---|---|---|---|---|---|---|
| 1A | $C_4F_2O_3$ | 3.15 | 0.0282 | 50 | 440 | 3.1 |
| 1B | $C_4F_8I_2$ | 3.54 | 0.045 | 37 | 387 | 6.8 |

TABLE 2

Ex. 1A and 1B: calculation of the total PTFE surface and of the surfaces covered by surfactant before and after the dialysis

| Ex. | Surface area PTFE Å²/l H₂O × 10²³ | Surface covered by the surfactant | | | |
|---|---|---|---|---|---|
| | | latex non dialyzed | | latex after dialysis | |
| | | Å²/l H₂O × 10²³ | % cover on PTFE | Å²/l H₂O × 10²³ | % cover on PTFE |
| Ex. 1A | 6.1 | 6.79 | 111 | 4.53 | 74 |
| Ex. 1B | 7.3 | 10.8 | 148 | 2.48 | 34 |

TABLE 3

Properties of the core-shell dispersions according to the invention

| Ex. | Particle diameter nm | Dry product g/l H₂O | PTFE content in the core-shell particle | | PS content in the core-shell particle | |
|---|---|---|---|---|---|---|
| | | | theoretic % | found* % | theoretic % | found* % |
| 2 | 97.6 | 112 | 6.5 | 5.2 | 93.5 | 94.8 |
| 3 | 61.3 | 65 | 21.6 | 19.4 | 78.4 | 80.6 |
| 4 | 63.9 | 114 | 6.5 | 6.7 | 93.5 | 93.3 |
| 5 | 41.9 | 67 | 21.8 | 19.4 | 78.2 | 80.6 |

*determined by TGA

What is claimed is:

1. A method for making a manufactured article, comprising the step of:

subjecting a composition containing core-shell particles having a core based on polytetrafluoroethylene-based polymers (PTFE) and shell based on styrene-based polymers (PS) to moulding or extrusion to obtain the manufactured article, the core-shell particles having an average diameter from 10 to 170 nm and containing an amount by weight of PTFE from 3 to 50%. wherein the core based on PTFE has an average diameter from 5 to 100 nm.

2. A manufactured article obtained with the method of claim 1.

3. A method of making a manufactured article, comprising the steps of:

coagulating a composition containing core-shell particles having a core based on polytetrafluoroethylene-based polymers (PTFE) and shell based on styrene-based polymers (PS) to form granules, the core-shell particles having an average diameter from 10 to 170 nm and containing an amount by weight of PTFE from 3 to 50%, wherein the core based on PTFE has an average diameter from 5 to 100 nm; and subjecting the granules to moulding or extrusion to obtain the manufactured article.

4. A method according to claim 1, wherein the polytetrafluoroethylene-based polymers (PTFE) are homopolymers of tetrafluoroethylene (TFE) or copolymers of TFE with one or more comonomers of hydrogenated or fluorinated type, containing at least one ethylene type unsaturation, said comonomers in amounts from 0 to up to 3% by mole with respect to the total mole of monomers.

5. A method according to claim 4, wherein the hydrogenated comonomers are ethylene, propylene or acrylic monomers.

6. A method according to claim 4, wherein the fluorinated comonomers are selected from a group consisting of $C_3$–$C_8$ perfluoroolefins, $C_2$–$C_8$ hydrogenated fluoroolefins, $C_2$–$C_8$ chloro- and/or bromo- and for iodo-fluoroolefins, $CF_2$=$CFOR_1$ (per)fluoroalkylvinylethers (PAVE), wherein $R_f$ is a $C_1$–$C_6$ (per)fluoroalkyl, CF2=CFOX (per)fluoro-oxyalkylvinylethers, wherein X is a $C_1$–$C_{12}$ alkyl, $C_1$–$C_{12}$ oxyalkyl or $C_1$–$C_{12}$ (per) flouro-oxyalkyl having one or more ether groups and fluorodioxoles, and fluorodioxoles.

7. method according to claim 4, wherein the comonomers are fluorinated.

8. A method according to claim 1, wherein the styrene-based polymers (PS) are homopolymers of styrene, styrene/acrylonitrile (SAN) polymers, styrene elastomers (SBR), acrylo/butadiene/styrene (ABS) polymers or methacryl/butadiene/styrene (MBS) polymers.

* * * * *